(12) United States Patent
Herb

(10) Patent No.: US 7,818,940 B2
(45) Date of Patent: Oct. 26, 2010

(54) SEALING ELEMENT

(75) Inventor: Armin Herb, Apfeldorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/317,219

(22) Filed: Dec. 18, 2008

(65) Prior Publication Data

US 2009/0145078 A1 Jun. 11, 2009

(30) Foreign Application Priority Data

Dec. 19, 2007 (DE) .................. 10 2007 055 878

(51) Int. Cl.
*E04B 1/38* (2006.01)
(52) U.S. Cl. .................. 52/704; 411/542; 411/533
(58) Field of Classification Search .................. 52/704, 52/707, 295, 408, 698; 411/542, 533, 480
See application file for complete search history.

(56) References Cited

U.S. PATENT DOCUMENTS

| | | | | |
|---|---|---|---|---|
| 2,020,767 A | * | 11/1935 | Bullis et al. .................. 138/98 |
| 3,090,203 A | * | 5/1963 | Durget .................. 405/259.4 |
| 4,361,997 A | * | 12/1982 | DeCaro .................. 52/512 |
| 4,467,581 A | * | 8/1984 | Francovitch .................. 52/410 |
| 4,476,660 A | * | 10/1984 | Francovitch .................. 52/515 |
| 4,574,551 A | * | 3/1986 | Giannuzzi .................. 52/512 |
| 4,658,558 A | * | 4/1987 | Verble .................. 52/410 |
| 4,744,187 A | * | 5/1988 | Tripp .................. 52/410 |
| 4,780,039 A | * | 10/1988 | Hartman .................. 411/531 |
| 4,875,818 A | * | 10/1989 | Reinwall .................. 411/369 |
| 5,018,329 A | * | 5/1991 | Hasan et al. .................. 52/410 |
| 5,040,350 A | * | 8/1991 | Panther .................. 52/704 |
| 5,066,181 A | * | 11/1991 | Bogel .................. 411/383 |
| 5,069,589 A | * | 12/1991 | Lemke .................. 411/533 |
| 5,236,272 A | * | 8/1993 | Hibbard .................. 403/24 |
| 5,267,423 A | * | 12/1993 | Giannuzzi .................. 52/410 |
| 5,320,460 A | * | 6/1994 | Murakami et al. .................. 411/55 |
| 5,378,102 A | * | 1/1995 | Mossman .................. 411/531 |
| 5,407,313 A | * | 4/1995 | Bruins et al. .................. 411/544 |
| 5,562,377 A | * | 10/1996 | Giannuzzi et al. .................. 411/82 |
| 5,628,161 A | * | 5/1997 | Giannuzzi et al. .................. 52/698 |

(Continued)

FOREIGN PATENT DOCUMENTS

DE 9403384 U1 4/1994

(Continued)

OTHER PUBLICATIONS

European Search Report dated May 4, 2010.

*Primary Examiner*—Brian E Glessner
*Assistant Examiner*—Joshua Ihezie
(74) *Attorney, Agent, or Firm*—Abelman, Frayne & Schwab

(57) ABSTRACT

A sealing element (11) for sealing fastening element holes in water-impermeable sealing layers of a structure has a cap-shaped receiving space (21) for receiving curable compound exiting from the borehole and extending between a contact area (18) provided for contacting the water-impermeable sealing layer, and a flange area (19) spaced from the latter, with the outer diameter (C) of the receiving space (21) at the contact area (18) corresponding to from two-times to six-times the inner diameter (D) of a through-opening (12) which is formed in the flange area (19) and is surrounded by springing blades (15) projecting into the through-opening (12) for a clamping engagement with the fastening element (5).

7 Claims, 3 Drawing Sheets

U.S. PATENT DOCUMENTS

| | | | |
|---|---|---|---|
| 5,707,191 A * | 1/1998 | Hempfling et al. | 411/533 |
| 5,709,059 A * | 1/1998 | Murphy et al. | 52/410 |
| 5,857,817 A * | 1/1999 | Giannuzzi et al. | 411/82.3 |
| 5,908,278 A * | 6/1999 | Hasan et al. | 411/533 |
| 6,205,730 B1 * | 3/2001 | Hasan et al. | 52/408 |
| 6,427,412 B1 * | 8/2002 | Mayle et al. | 52/545 |
| 6,665,991 B2 * | 12/2003 | Hasan | 52/410 |
| 6,722,095 B2 * | 4/2004 | Kobetsky | 52/410 |
| 2003/0033780 A1 * | 2/2003 | Hasan | 52/410 |
| 2003/0033783 A1 * | 2/2003 | Kobetsky | 52/512 |
| 2003/0196398 A1 * | 10/2003 | Hasan | 52/410 |
| 2004/0168396 A1 * | 9/2004 | Kuhn et al. | 52/698 |
| 2005/0166503 A1 * | 8/2005 | Panasik | 52/408 |
| 2010/0031595 A1 * | 2/2010 | Kelly | 52/408 |

FOREIGN PATENT DOCUMENTS

| | | |
|---|---|---|
| EP | 1150025 A1 | 10/2001 |
| FR | 2159758 A5 | 6/1973 |

* cited by examiner

SEALING ELEMENT

BACKGROUND OF THE INVENTION

1. Field of the Invention

The invention relates to a sealing element for sealing fastening element holes in water-impermeable sealing layers of a structure and having a cap-shaped receiving space for receiving a curable compound exiting from the borehole, which cap-shaped receiving space extends between a contact area provided for contacting the water-impermeable sealing layer and a flange area at a distance from the latter, and a boundary wall connecting the contact area and the flange area, wherein a through-opening defining a through-axis is provided in the flange area for a chemically anchorable fastening element and is surrounded by springing blades projecting into the through-opening for a clamping engagement with the fastening element.

2. Description of the Prior Art

In civil engineering constructions above and below ground such as, e.g., flat roofs and cellar rooms, in bridge supporting structures, tunnel construction, dump construction and shaft construction, various structural component parts must be sealed against external influences such as, e.g., water. Sealing is usually carried out by arranging water-impermeable sealing layers like plastic sheeting, asphalt sheeting, coatings and the like at or on the structural component part. In order to fasten the elements to the sealed structural component parts, chemically anchorable fastening elements, for example, are inserted through the seal into the structural component parts. The drilled water-impermeable sealing layer must then be completely sealed.

A material piece of the sealing layer, known as a patch or plug, is provided, for example, for sealing the drilled water-impermeable sealing layer and is welded or glued to the water-impermeable sealing layer, on one hand, and to the fastening element anchored in and projecting out of the substrate, on the other hand.

The known solution is disadvantageous in that tightness between the material piece and the water-impermeable sealing layer and between the material piece and the fastening element usually cannot be ensured under construction site conditions. Further, strict requirements are imposed with respect to water-tightness, e.g., in bridge construction, also when fastening elements are arranged at an inclination to the perpendicular relative to the concrete surface. These requirements usually cannot be met by the aforementioned material pieces which are provided additionally.

EP 1 150 025 A1 discloses a sealing element of the generic type having a cap-shaped receiving space. A through-opening is provided in the flange area which is arranged at a distance from the contact area. The through-opening is surrounded by a plurality of springing blades projecting into the through-opening for a clamping engagement with the fastening element. The cap-shaped receiving space is defined radially by a boundary wall which joins the contact area to the flange area and which is formed by a bead wall of a reinforcement bead surrounding the through-axis coaxially. The sealing element can be placed on the fastening element and comes into contact with the sealing layer when the fastening element is set. In the set state, the blades are oriented facing the sealing layer and penetrate through the receiving space for receiving the curable compound up to the area of the borehole.

The known solution is disadvantageous in that curable compound exiting from the borehole during the setting process can only be received in the area between the inwardly directed blades and the boundary wall of the receiving space. Because of the reinforcement bead forming a contact area, the area located radially outside of the reinforcement bead is not available for a complete sealing of a fastening element hole. Further, raised portions or dirt surrounding the borehole can prevent a complete sealing of the fastening holes so that the compound that exits during the process of setting of the fastening element, can escape outward and soil the surroundings so that a flawless sealing of the fastening element hole can no longer be ensured.

SUMMARY OF THE INVENTION

It is the object of the present invention to provide a sealing element and a sealing method with the sealing element which would ensure a flawless and simple sealing of the fastening element hole.

This and other objects of the present invention, which will become apparent hereinafter, are achieved by providing a sealing element in which the outer diameter of the receiving space in the contact area corresponds to from two-times to six-times the inner diameter of the through-opening.

This ratio ensures a sufficiently large receiving space available for receiving the curable compound exiting from the borehole. Accordingly, the selected amount of compound to be injected into the borehole can be sufficiently large so that a corresponding amount exits from the borehole again when the fastening element is inserted into the borehole and a complete sealing of the fastening element hole under the sealing element is accordingly ensured. Raised portions or dirt surrounding the borehole can be received in the cap-shaped receiving space of the sealing element while the fastening element hole is adequately sealed. The sealing element is pressed firmly against the sealing layer by the blades in the set state, which ensures a complete sealing on the radial outer side.

In an advantageous manner, the blades which constrict the through-opening in the fixed state of the fastening element do not penetrate a plane defined by the contact area, so that the contact area snugly contacts the water-impermeable sealing layer and produces an advantageous sealing.

Proceeding from the contact area of the sealing element, the boundary wall advantageously has a first wall portion and at least a second wall portion adjoining the first wall portion. The first wall portion encloses a first angle with the through-axis, and the second wall portion encloses a second angle with the through-axis, with the first angle being greater than the second angle. Accordingly, the cap-shaped receiving space of the sealing element is shell-shaped with a side edge area, terminating in a flat manner. Two receiving areas of the receiving space are formed for the curable compound exiting from the borehole. The height of the receiving area of the receiving space which directly surrounds the through-axis of the through-opening is greater than in the side edge area which terminates in a flat manner. The receiving area of the receiving space, which directly surrounds the through-axis of the through-opening and is recessed in relation to a plane defined by the contact area, offers a sufficiently large volume for receiving raised portions or dirt surrounding the borehole so that a flawless sealing of the fastening element hole is ensured. The other receiving space in the side edge area ending in a flat manner ensures a uniform distribution of the curable compound exiting from the borehole under the sealing element.

The first angle is preferably in a range from 65° to 85°, advantageously 75° to 80°, and the second angle is in a range from 10° to 50°, advantageously 25° to 35°, which ensures an advantageous distribution of the curable compound received in the receiving space. It is noted in this connection that neither the side of the first wall portion facing the receiving space nor the at least second wall portion need necessarily run in a straight line. In this connection, the indicated angles point out the average inclination of the corresponding wall portion from one transition to the other transition.

In an advantageous manner, the boundary wall is provided, at least in some areas of its side facing the receiving space, with a flow contour for the uniform distribution of the curable compound exiting from the borehole, which ensures an advantageous distribution of the curable compound received in the receiving space. The flow contour is advantageously formed by a suitable surface shape of the side of the corresponding wall portion facing the receiving space.

The flow contour is preferably provided at the first wall portion of the boundary wall, which ensures an advantageous distribution of the curable compound received in the receiving space.

The flow contour preferably has at least two steps which are arranged in a radially circumferentially extending manner. The transitions of the steps are advantageously rounded. The steps are advantageously arranged coaxially with the through-axis of the through-opening and are advantageously formed during the production of the sealing element. The distribution of the curable compound received in the receiving space is advantageously ensured by the stepped shape.

In an alternative embodiment, the flow contour is formed, for example, as projections or depressions extending in a helical or fan-shaped manner.

A radially circumferentially extending flow edge is preferably provided as a flow barrier at a distance from the outer edge of the sealing disk. This flow barrier limits a high pressure of the distributed curable compound in one direction on the radial outer side.

The sealing disk is preferably transparent at least in some areas so that a user can visually detect and monitor the degree to which the receiving space is filled and, therefore, the seal that has been provided.

The first wall portion is preferably transparent at least in the circumferential area between the outer edge and the radially circumferential flow edge. This area surrounds the through-opening at a distance therefrom so that a secure sealing of the fastening element hole can be discerned visually when this area is completely filled.

At least two springing holding portions for temporarily fixing the sealing element to a fastening element are preferably provided at the through-opening so that the sealing element is premounted at a fastening element so as to be available to the user and can be fastened to the fastening element at a predefined distance from the end of the fastening element that can be inserted into the borehole. When the fastening element is inserted, the springing holding portions deflect radially outward and clamp inside the borehole so that the sealing element is additionally held in the borehole in a clamping manner until the curable compound hardens.

The sealing element is advantageously made of a plastic and, in a particularly advantageous manner, is manufactured in an injection molding process.

The method according to the invention for sealing fastening element holes at a water-impermeable sealing layer of a structure with an inventive sealing element includes the following method steps:

a) forming a borehole in the substrate through the water-impermeable sealing layer;

b) filling the borehole with a curable compound, wherein the amount of curable compound introduced is greater than the difference in volume between the borehole volume and the partial volume of the fastening element penetrating into the borehole;

c) placing the sealing element on the end of the fastening element to be inserted into the borehole; and d) inserting the fastening element into the borehole, wherein the sealing element outwardly seals the fastening element hole after contacting the sealing layer and receives the curable compound exiting from the borehole.

The method according to the invention is simpler and safer to use, and there are no maintenance periods between the individual work cycles. A preliminary cleaning of the area surrounding the borehole can be dispensed with. Further, the fastening element hole can be reliably sealed even when the fastening element extends at an inclination to the substrate surface.

The sealing element is preferably slid over the end of the fastening element by 15 mm to 30 mm so that when setting the fastening element there is an insertion portion that facilitates setting of the fastening element.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
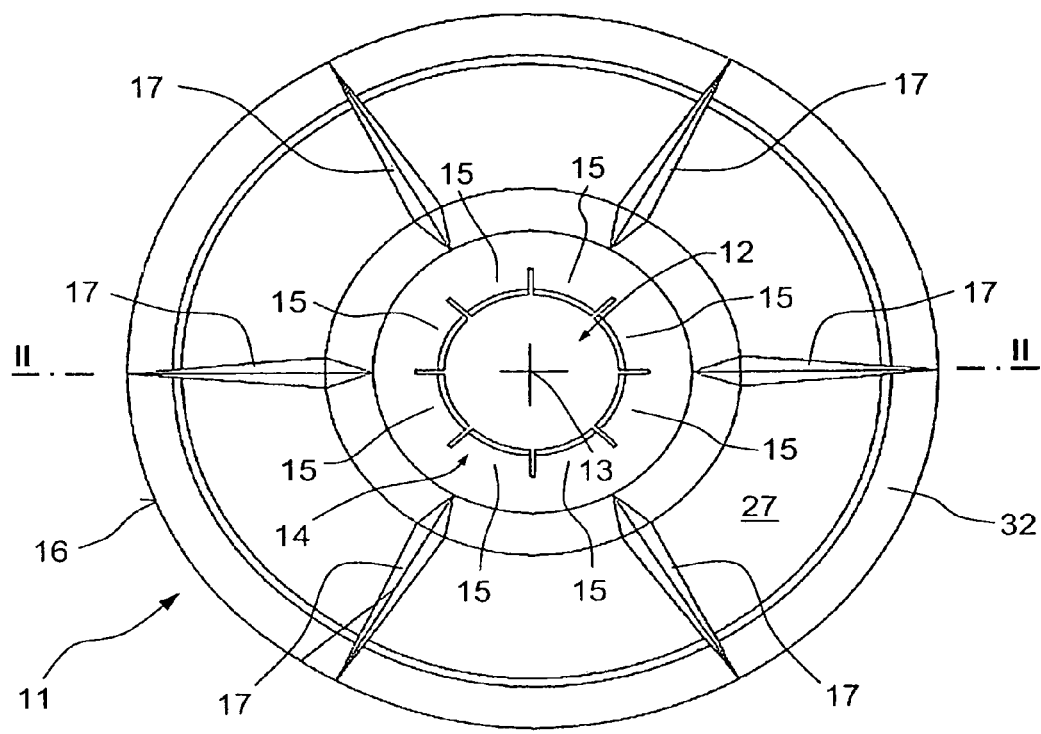
FIG. 1 a plan view of a first embodiment of a sealing element according to the present invention.
Figure 2:
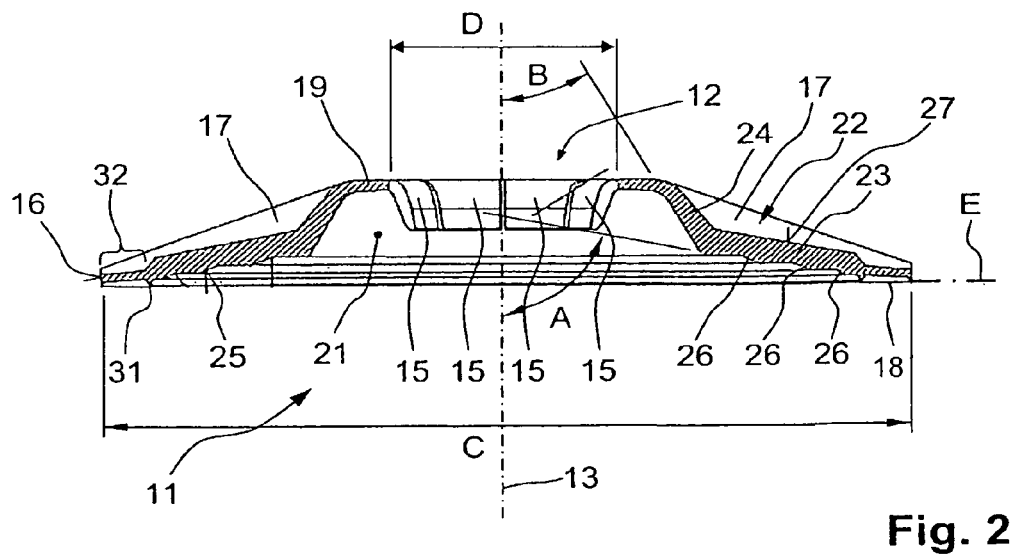
FIG. 2 a cross-sectional view of the sealing element along line II-II in FIG. 1.

The sealing element 11, shown in FIGS. 1 and 2, for sealing fastening element holes in a water-impermeable sealing layer of a structure has a cap-shaped receiving space 21 for a curable compound exiting from the borehole. The receiving space 21 extends between a contact area 18, which is provided for contacting the water-impermeable sealing layer, and a flange area 19 spaced from the contact area 18, and a boundary wall 22 connects the contact area 18 with the flange area 19. A through-opening 12 defining a through-axis 13 is provided in the flange area 19 for a chemically anchorable fastening element 5. The through-opening 12 is surrounded by springing blades 15 projecting into the through-opening 12 for a clamping engagement with the fastening element. The outer diameter C of the receiving space 21 in the contact area 18 corresponds to two-times to six-times the inner diameter D of the through-opening 12.

Proceeding from the outer edge 16 of the sealing element 11, the boundary wall 22 has a first wall portion 23 and a second wall portion 24 adjoining the first wall portion 23. In this embodiment, the first wall portion 23 encloses a first angle A of 80° with the through-axis 13, and the second wall portion 24 encloses a second angle B with the through-axis 13 so that the first angle A is greater than the second angle B. The first angle A can amount to from 65° to 85°, and the second angle B can be 10° to 50°.

The blades 15, which surrounds the through-opening, are separated from one another by slits and form the clamping arrangement for the clamping engagement of the sealing element 11 at the fastening element. Each of the free ends faces the receiving space 21, these free ends do not penetrate a plane E defined by the contact area 18. The sealing element 11 is provided, at the side 27 of the boundary wall 22 remote of the receiving space 21, with reinforcement ribs 17 extending on the radial outer side for purposes of reinforcement.

The first wall portion 23 is provided, at its side facing the receiving space 21, with a flow contour 25 for the uniform distribution of the curable compound exiting from the borehole. The flow contour 25 is formed by a plurality of steps 26 arranged in a radial circumferential manner. The transitions between the steps 26 are rounded.

A radially circumferentially extending flow edge 31 is provided as a flow barrier at a distance from the outer edge 16 of the sealing element 11. The first wall portion 23 of the sealing element 11 is transparent in the area 32 between the outer edge 16 and the radial circumferential flow edge 31 so that the user can discern the degree of filling and, therefore, the quality of the seal created, at least in the area 32.

The method for sealing fastening element holes at a water-impermeable sealing layer of a structure with a sealing element 11 will be described below with reference to FIGS. 3A to 3C.

Figure 3A:
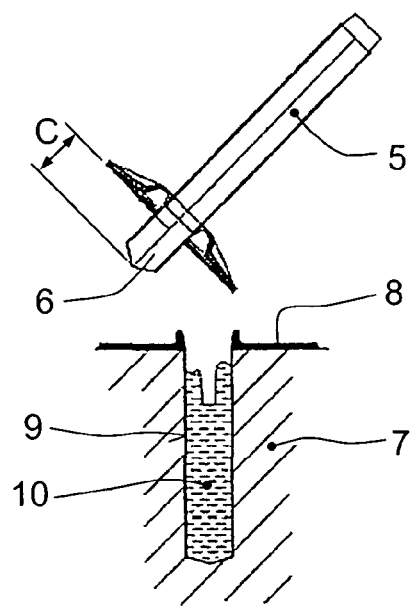
FIGS. 3A-C schematic sectional views illustrating three steps of a sealing method according to the present invention with a sealing element according to the invention.

As is shown in FIG. 3A, a borehole 9 is first made in the substrate 7 through the water-impermeable sealing layer 8. The borehole 9 is then filled with a predetermined amount of a curable compound 10, wherein the amount of curable compound 10 introduced is greater than the difference in volume between the borehole volume and the partial volume of the fastening element 5 penetrating into the borehole. The sealing element 11 is then placed on the free end 6 of a fastening element 5, or the end to be inserted into the borehole 9, in this embodiment example at a distance C of 20 mm.

Figure 3B:
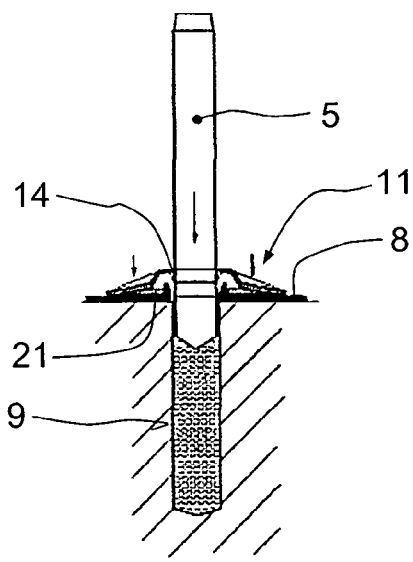

As is shown in FIG. 3B, the fastening element 5 is then inserted into the filled borehole 9, and the sealing element 11 makes contact with the sealing layer 8 and seals the fastening element hole toward the outer side. The sealing element 11 is held at the fastening element 5 during the setting process by means of the blades 15 and is pressed against the sealing layer 8 so that the curable compound 10 exiting from the borehole is received in the receiving space 21 of the sealing element 11 and cannot exit at the sides in an undesirable manner. Any projections surrounding the borehole 9 can be received in the cap-shaped or shell-shaped receiving space 21 of the sealing element 11.

Figure 3C:
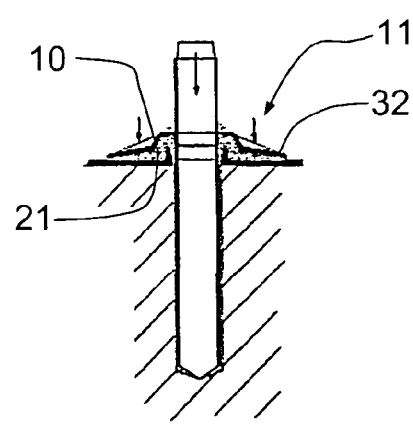

As is shown in FIG. 3C, the curable compound 10 located in the receiving space is uniformly distributed under the sealing element 11. The state of filling and quality of the seal created can be checked through the transparent area 32 of the first wall portion 23 of the sealing element 11.

Figure 4:
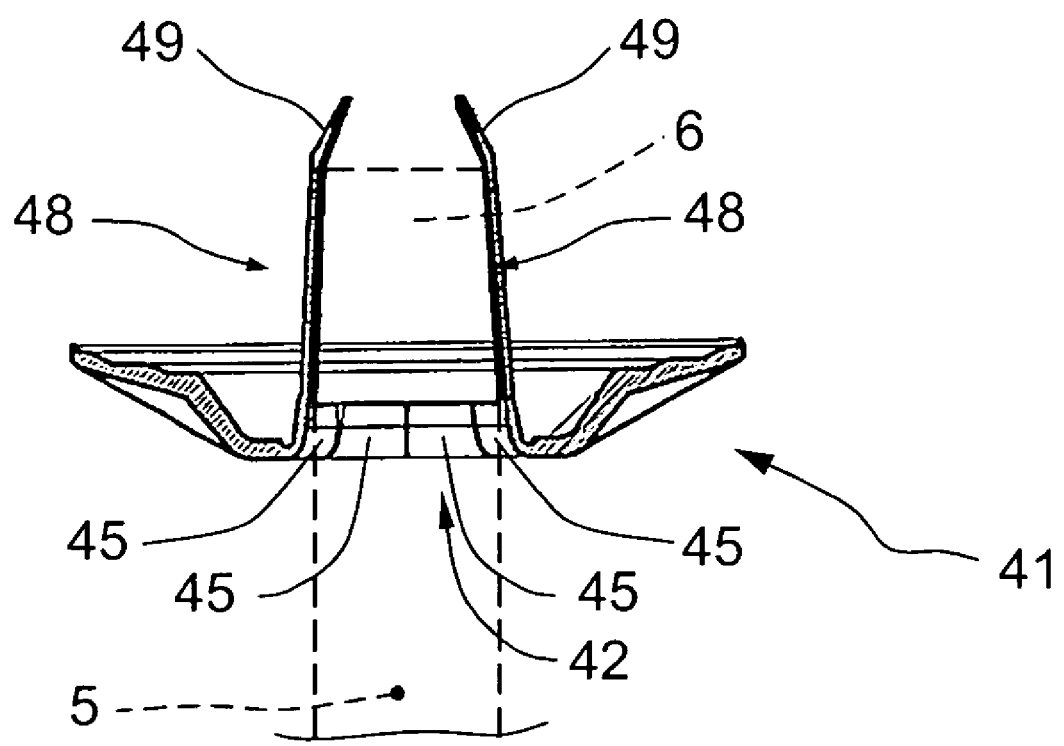
FIG. 4 a cross-sectional view of a second embodiment of a sealing element according to the present invention.

FIG. 4 shows a second embodiment example of a sealing element 41. Two diametrically opposed springing holding portions 48 are additionally provided at the through-opening 42 for temporarily fixing the sealing element 41 to a fastening element 5. The free ends 49 of the holding portions 48 face one another. When the sealing element 41 is placed on the end 6 of the fastening element 5 to be inserted into the borehole, the free ends 49 of the holding portions 48 serve, for example, as a position marker. When the fastening element 5 is set, the holding portions 48 clamp in the annular gap between the borehole wall and the outer contour of the fastening element 5 so that the sealing element 41 is held by the blades 45 at the fastening element 5 and also in the borehole by the clamped holding portions 48 until the curable compound hardens.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A sealing element for sealing a hole formed in a water-impermeable sealing layer (8) of a structure for a fastening element (5) chemically anchorable with a curable compound, the sealing element comprising:
    a contact area (18) for contacting the water-impermeable sealing layer (8);
    a flange area (19) spaced from the contact area (18) and forming a through-opening (12; 42) for the fastening element (5);
    a cap-shaped space (21) for receiving the curable compound (10) exiting from a borehole and extendable between the contact area (18) and the flange area (19), the cap-shaped receiving space (21) having an outer diameter (C) at the contact area (18) that corresponds to from two-times to six times an inner diameter (D) of the through-opening (12; 42);
    spring blades (15; 45) surrounding the through-openings (12; 42) and projecting thereinto for clampingly engaging the fastening element (5); and
    a boundary wall (22) connecting the contact area (18) and the flange area (19), the boundary wall (22) having, proceeding from the contact area (18) of the sealing element (11), a first wall portion (23) and at least a second wall portion (24) adjoining the first wall portion (23), wherein the first wall portion (23) encloses a first angle (A) with a through-axis (13) of the through-opening (12), and the second wall portion (24) encloses a second angle (B) with the through-axis (13), wherein the first angle (A) is greater than the second angle (B), wherein the boundary wall (22) is provided, at least in some areas of its side facing the receiving space (21), with a flow contour (25) for a uniform distribution of the curable compound (10) exiting from the borehole (9), wherein the flow contour (25) has at least two steps (26) which are arranged in a radially circumferentially extending manner.

2. A sealing element according to claim 1, wherein the first angle (A) amounts to from 65° to 85°, and the second angle (B) amounts to from 10° to 50°.

3. A sealing element according to claim 1, wherein the flow contour (25) is provided at the first wall portion (23) of the boundary wall (22).

4. A sealing element according to claim 1, wherein a radially circumferentially extending flow edge (31) is provided as a flow barrier at a distance from an outer edge (16) of the sealing element (11).

5. A sealing element according to claim 1, the sealing element (11; 41) is transparent at least in some areas.

6. A sealing element according to claim 5, wherein the first wall portion (23) is transparent at least in the area (32) between an outer edge (16) and the radially circumferential flow edge (31).

7. A sealing element according to claim 1, wherein at least two springing holding portions (48) are provided at the through-opening (42) for temporarily fixing the sealing element (41) to a fastening element (5).

* * * * *